United States Patent
Paish

(10) Patent No.: US 7,455,503 B2
(45) Date of Patent: Nov. 25, 2008

(54) APPARATUS FOR OSCILLATING A VANE

(75) Inventor: Marc Paish, Hull (GB)

(73) Assignee: Pulse Group Holdings Limited, South Yorkshire (GB)

( * ) Notice: Subject to any disclaimer, the term of this patent is extended or adjusted under 35 U.S.C. 154(b) by 382 days.

(21) Appl. No.: 11/446,038

(22) Filed: Jun. 2, 2006

(65) Prior Publication Data
US 2006/0275109 A1     Dec. 7, 2006

(30) Foreign Application Priority Data
Jun. 3, 2005    (GB)    ................ 0511340.2

(51) Int. Cl.
*F03B 17/06*    (2006.01)
(52) U.S. Cl. ............... 416/100; 416/170 R; 415/4.2; 415/4.4; 415/125
(58) Field of Classification Search ............... 415/4.2, 415/4.4, 125, 907; 416/78, 100, 170 R; 290/1 D, 290/43, 54
See application file for complete search history.

(56) References Cited

U.S. PATENT DOCUMENTS 2,978,036 A * 4/1961 Schneider ............... 416/108
5,009,571 A * 4/1991 Smith ............... 416/79

FOREIGN PATENT DOCUMENTS

WO 2004110859 12/2004
WO 2005108781 11/2005

OTHER PUBLICATIONS

International Search Report Application No. GB511340.2 dated Sep. 25, 2006.

* cited by examiner

*Primary Examiner*—Ninh H Nguyen
(74) *Attorney, Agent, or Firm*—Howard & Howard Attorneys, P.C.

(57) ABSTRACT

An apparatus for oscillating a vane comprising
a main lever pivoted at one end about a reference axis, and pivotally coupled at the other end to the vane about a vane axis remote from the reference axis;
an angle change assembly connected to the vane such that rotation of the angle change assembly rotates the vane; and,
a drive assembly, the drive assembly comprising
a crank arm adapted to be pivoted about a fixed crank axis;
a lever drive arm pivotally connected to the main lever at a point remote from the reference axis and pivotally connected to the main crank remote from the crank axis;
a coupling member having first and second coupling arms connected together at a base, the base being adapted to pivot about a coupling axis;
an angle drive arm connected at a first end to the angle change assembly for rotation thereof and pivotally connected to the first coupling arm remote from the coupling axis;
the second coupling arm being pivotally connected to the lever drive arm remote from the coupling axis, the pivot being free to slide along the lever drive arm.

19 Claims, 7 Drawing Sheets

APPARATUS FOR OSCILLATING A VANE

Figure 1:
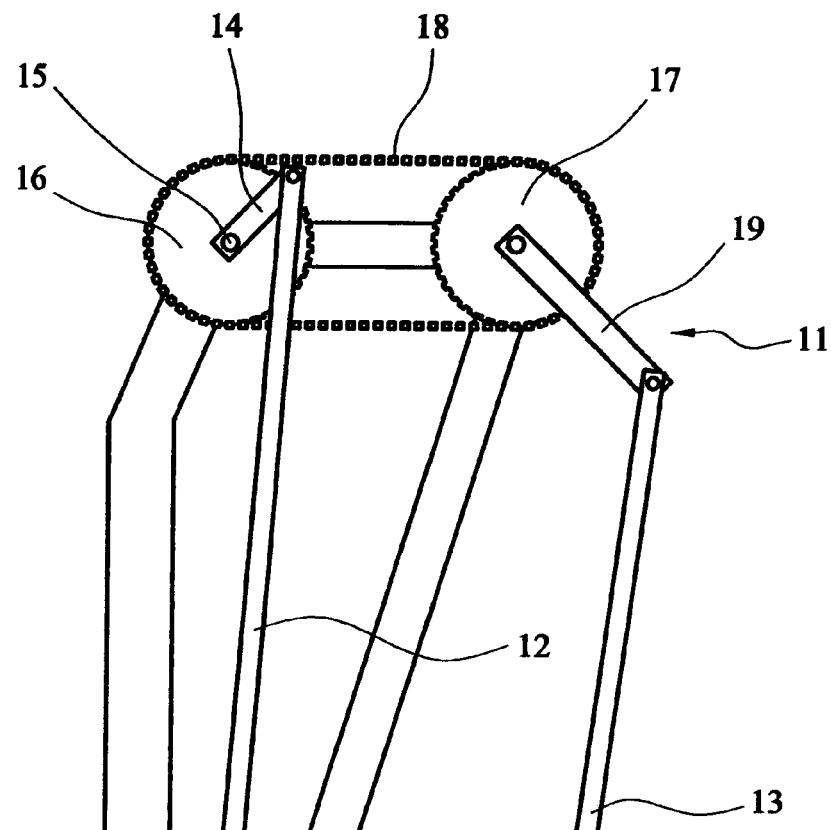
Figure 1:
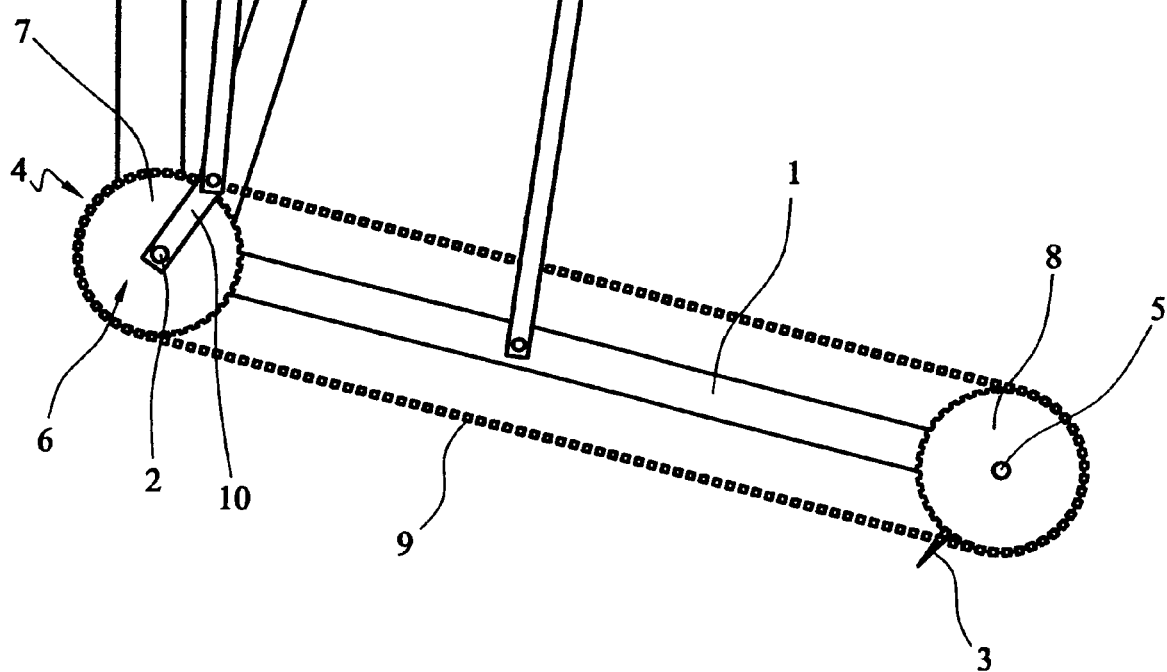

The subject patent application claims priority to and all the benefits of Great Britain Patent Application No. 0511340.2, which was filed on Jun. 3, 2005 with The UK Patent Office.

The present invention relates to an apparatus for oscillating a vane in a fluid stream. More particularly, the apparatus is used either (a) to generate power when the vane is caused to oscillate by stream flow, or (b) to propel a vessel in fluid (water) when the apparatus is driven by an external power source.

Mechanisms for oscillating vanes in a stream for power generation or propulsion are known. Effective oscillation is achieved by laterally oscillating the vane from side to side whilst simultaneously oscillating the vane about its own axis. The phase relation between these two oscillations affects the power/propulsion generated by the oscillation. Typically the phase difference is about 90°.

Drive assemblies for oscillating such vanes are therefore required to simultaneously provide two driving oscillations having a predetermined phase relationship between them. This is typically done by two separate crank shafts and associated mechanical linkages. It can be difficult however to control the angle of the vane very precisely with such an assembly as the vane traverses a stream. Such an assembly is also unsuitable where space is limited.

Accordingly, the present invention provides an apparatus for oscillating a vane comprising
- a main lever pivoted at one end about a reference axis, and pivotally coupled at the other end to the vane about a vane axis remote from the reference axis;
- an angle change assembly connected to the vane such that rotation of the angle change assembly rotates the vane; and,
- a drive assembly, the drive assembly comprising
- a crank arm adapted to be pivoted about a fixed crank axis;
- a lever drive arm pivotally connected to the main lever at a point remote from the reference axis and pivotally connected to the main crank remote from the crank axis;
- a coupling member having first and second coupling arms connected together at a base, the base being adapted to pivot about a coupling axis;
- an angle drive arm connected at a first end to the angle change assembly for rotation thereof and pivotally connected to the first coupling arm remote from the coupling axis;
- the second coupling arm being pivotally connected to the lever drive arm remote from the coupling axis, the pivot being free to slide along the lever drive arm.

The apparatus according to the invention allows accurate control of the angle of the vane with respect to the stream flow as the vane laterally traverses the stream. Also, as only one crank shaft is required it is suitable for use where space is limited.

Preferably, the lever drive arm comprises a slot running at least partially along its length, the pivot between lever drive arm and second coupling arm being free to move along the guide. The guide can be a linear guide. The guide can be a slot.

Preferably, the angle change assembly comprises angle change means free to pivot about the reference axis and a linkage connecting the vane to the angle change means such that rotation of the angle change means rotates the vane, the angle drive arm being connected to the angle change means.

The angle change means can comprise a wheel free to rotate about the reference axis, the angle drive arm being connected to the wheel.

Alternatively, the angle change means can comprise a first wheel free to rotate about the reference axis, a second wheel free to rotate about a second axis remote from the reference axis and a second linkage means extending between the two wheels, the angle drive arm being connected to the second linkage means.

The second linkage means can comprise a chain which passes around the first and second wheels.

Alternatively, the angle change means can comprise an angle change arm pivotally connected to the reference axis, the angle drive arm being pivotally connected to the angle change arm.

The pivot between angle change arm and angle drive arm can be free to slide along the angle change arm.

The angle change assembly can further comprise a guide arm having one end pivotally connected to the end of the angle drive arm to restrict the motion of the angle drive arm.

The pivot between angle drive arm and guide arm can be free to slide along the guide arm.

The opposite end of the guide arm can be pivotally connected to a fixed point.

Alternatively, the opposite end of the guide arm can be pivotally connected to the main lever.

Alternatively, both ends of the guide arm can be free to slide on tracks laterally displacing the guide arm.

Alternatively, the guide arm can be connected in fixed relation to the main lever.

The guide arm can be curved. The radius of curvature of the guide arm may vary along its length.

The first and second coupling arms can be co-linear. Alternatively, the first and second arms can be co-planar but not co-linear. The coupling member can be V shaped.

The present invention will now be described by way of example only, and not in any limitative sense, with reference to the accompanying drawings in which FIG. 1 shows a known apparatus for oscillating a vane including a known drive assembly;

FIGS. 2 to 7 show embodiment of apparatus for oscillating a vane according to the invention.

Shown in FIG. 1 is a known apparatus for oscillating a vane in a stream. The apparatus comprises a main lever 1 pivoted about a reference axis 2. Pivotally coupled to the opposite end of the main lever is the vane 3. The vane is coupled to an angle change assembly 4 for oscillation of the vane 3 about a vane axis 5. The angle change assembly 4 comprises an angle change means 6 comprising a first wheel 7 free to pivot about the reference axis 2 and a second wheel 8 free to pivot about the vane axis 5. A linkage 9 extends between the two wheels 7,8 such that rotation of the first wheel 7 rotates the second wheel 8 and hence the vane 3. An angle change arm 10 is pivotally coupled to the reference axis and is connected to the first wheel 7 such that rotating the angle change arm 10 rotates the wheel 7.

The apparatus further comprises a drive assembly 11. The drive assembly 11 comprises an angle drive arm 12 connected to the angle change assembly 4. Motion of the angle drive arm 12 results in oscillation of the vane 3. The drive assembly 11 further comprises a lever drive arm 13 connected to the main lever 1 between reference axis 2 and vane 3. Motion of the lever drive arm 1 pivots the main lever 1 about the reference axis 2 so laterally oscillating the vane 3 from side to side.

The opposite end of the angle drive arm 12 is pivotally connected to a first crank arm 14 which is in turn connected to a crank shaft 15. Rotation of the crank shaft 15 rotates the first crank arm 14 and hence displaces the angle drive arm 12. A first crank wheel 16 is also connected to the crank shaft 15. A second crank wheel 17 is connected to the first wheel 16 by a chain 18. Connected to the second crank wheel 17 is a second crank arm 19 which turns with the wheel 17. The lever drive arm 13 is pivotally connected to the second crank arm 19. Rotation of the crank arm 15 rotates the first crank wheel 16 and hence the second crank wheel 17. This in turn rotates the second crank arm 19 which displaces the lever drive arm 13. The phase difference between oscillation of the angle drive arm 12 and lever drive arm 13 is generated by the different phase of the first and second crank arms 14,19.

Such a drive assembly has a number of drawbacks. Firstly the oscillation created by a crank and connection rod is not perfectly sinusoidal. It is asymmetric to a degree which is determined by the geometry of the system with a larger crank and shorter connecting rods tending to increase the degree of asymmetry. Because the first and second crank arms 14,19 are out of phase (by about 90°) the lateral oscillation of the vane 3 and the oscillation about the vane axis 5 differ from the perfect sinusoid at different times in the oscillation cycle. This results in deviation of the angle of the vane 3 from the optimum reducing efficiency.

The drive assembly 11 is also unsuitable for use in confined spaces.

Figure 2:
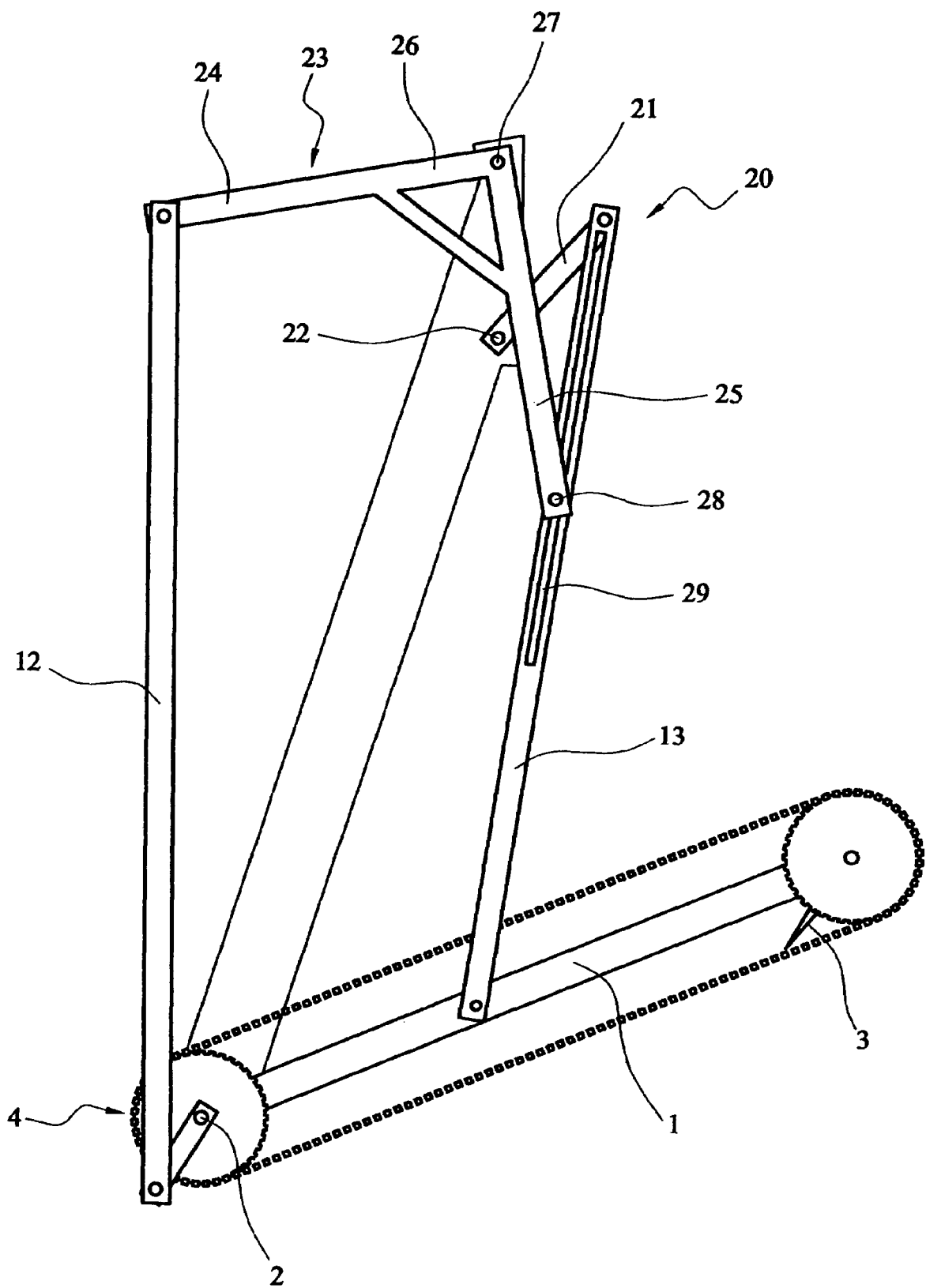

Shown in FIG. 2 is an apparatus for oscillating a vane according to the invention. The main lever 1 and angle change assembly 4 are identical to that of FIG. 1 and will not be discussed further.

The drive assembly 20 comprises a main crank 21 connected at one end to a crank axle 22. The opposite end of the crank 21 is pivotally connected to a lever drive arm 13 which at its opposite end is connected to the main lever 1 remote from the reference axis 2.

The drive assembly 20 further comprises a coupling member 23 having first and second coupling arms 24,25 connected together at a base 26. The base 26 is pivotally connected to a fixed coupling axis 27. The first coupling arm 24 is pivotally connected to the angle drive arm 12 which at its opposite arm is connected to the angle change assembly 4. The second coupling arm 25 is pivotally connected to the lever drive arm 13. The pivot 28 is free to slide along a slot 29 extending part way along the length of the lever drive arm 13.

In use the crank axle 22 turns the main crank 21 which in turn reciprocally drives the lever drive arm 13. This pivots the main lever 1 about the reference axis 2 so driving the vane 3 from side to side.

The lever drive arm 13 also pivots the coupling member 23 from side to side about the coupling axis 27. This in turn reciprocally drives the angle drive arm 12, rotating the angle change assembly 4 and hence the vane 3.

As with known drive assemblies, the oscillation of the angle drive arm 12 and lever drive arm 13 differ from perfectly sinusoidal as they are driven by crank arms. However the two cycles differ in the same way. This synchronisation means the angle of the vane 3 is kept closer to the optimum throughout the vane oscillation.

Figure 3:
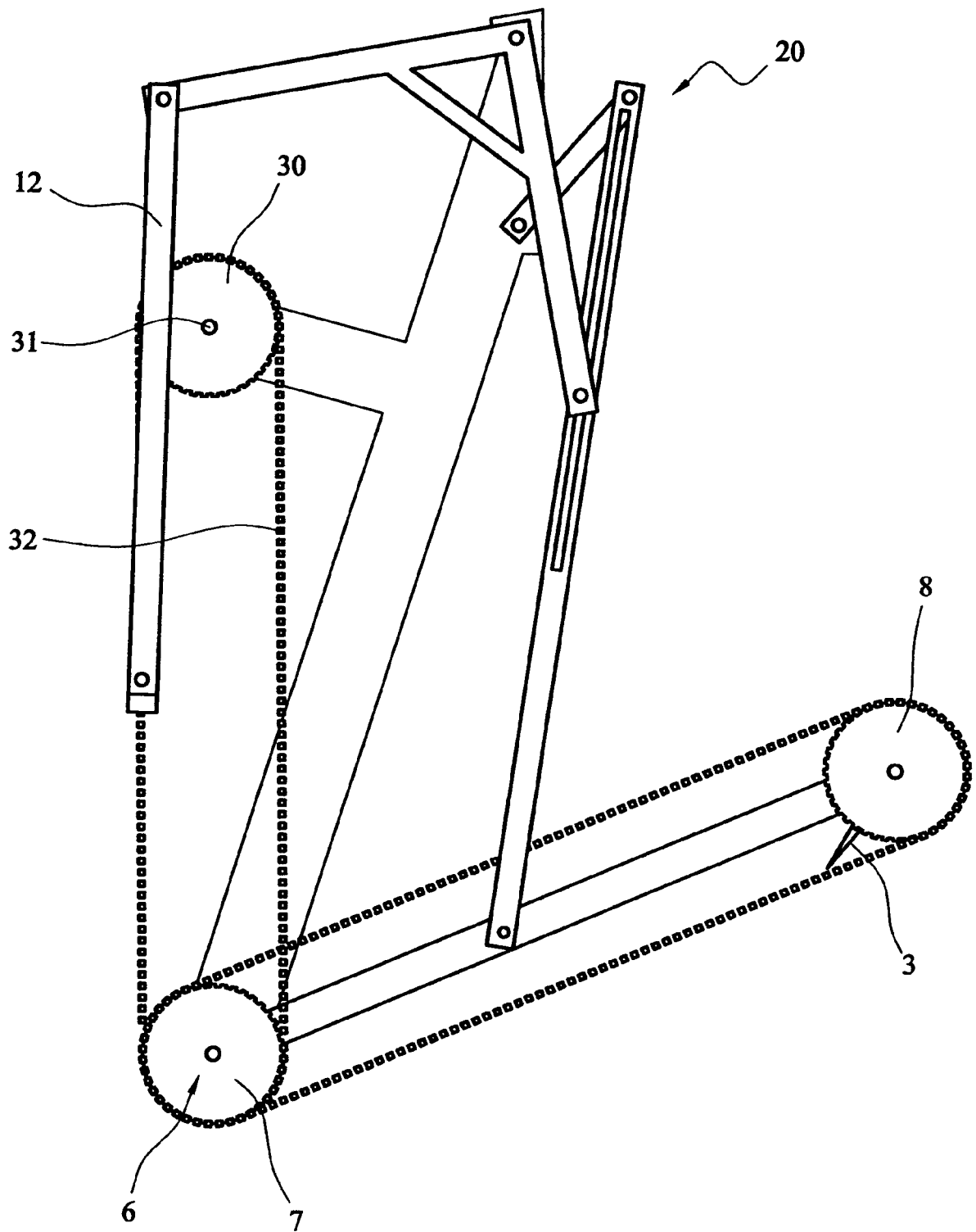

Shown in FIG. 3 is a further embodiment of an apparatus according to the invention. Only the angle change means 6 of this embodiment differs from the embodiment of FIG. 2. In addition to the first and second wheels 7,8 of the embodiment of FIG. 2, this embodiment comprises a third wheel 30 free to rotate about a fixed axis 31 remote from the reference axis 2. A chain 32 passes around the first and third wheels 7,30 linking them together so that rotation of one rotates the other. The angle drive arm 12 is connected to the chain 32 such that displacement of the angle drive arm 12 rotates the vane 3.

Figure 4:
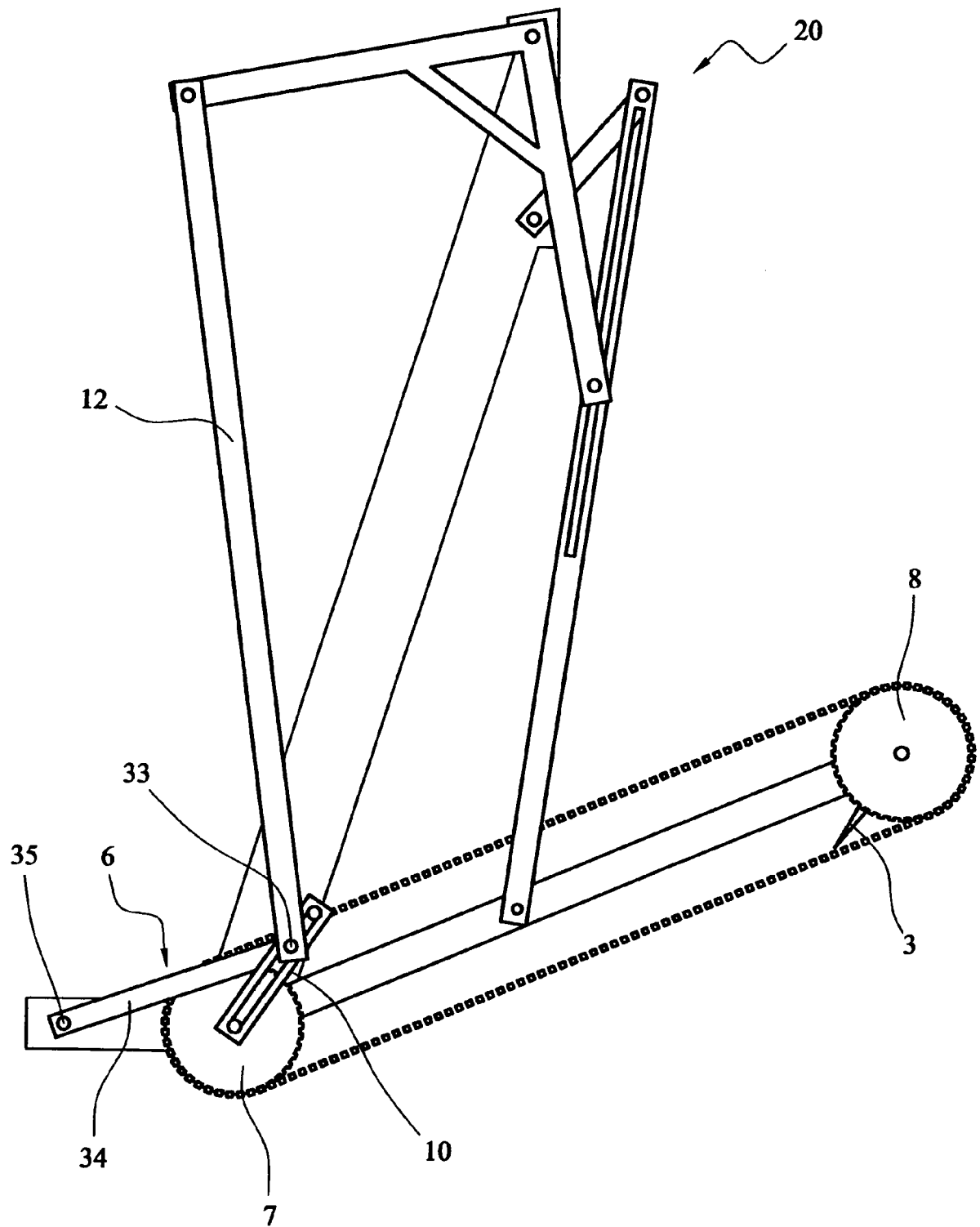

Shown in FIG. 4 is a further embodiment of an apparatus according to the invention. Again, only the angle change means 6 differs from that of the previous embodiment and is described in detail. Pivotally connected to the reference axis 2 is an angle change arm 10. The angle change arm 10 is connected to the first wheel 7 such that rotation of the angle change arm 10 rotates the first wheel 7 and hence the vane 3. The angle drive arm 12 is pivotally connected to the angle change arm 10. This pivot 33 is free to slide along the angle change arm 10. This pivot 33 is also connected to a guide arm 34. The opposite end of the guide arm 34 is pivotally connected to a fixed point 35 remote from the apparatus. The guide arm 34 restricts the motion of the end of the angle drive arm 12. This allows greater control over the angle the vane 3 presents to the stream as the vane 3 laterally traverses the stream. This increases the efficiency of the apparatus.

Figure 5:
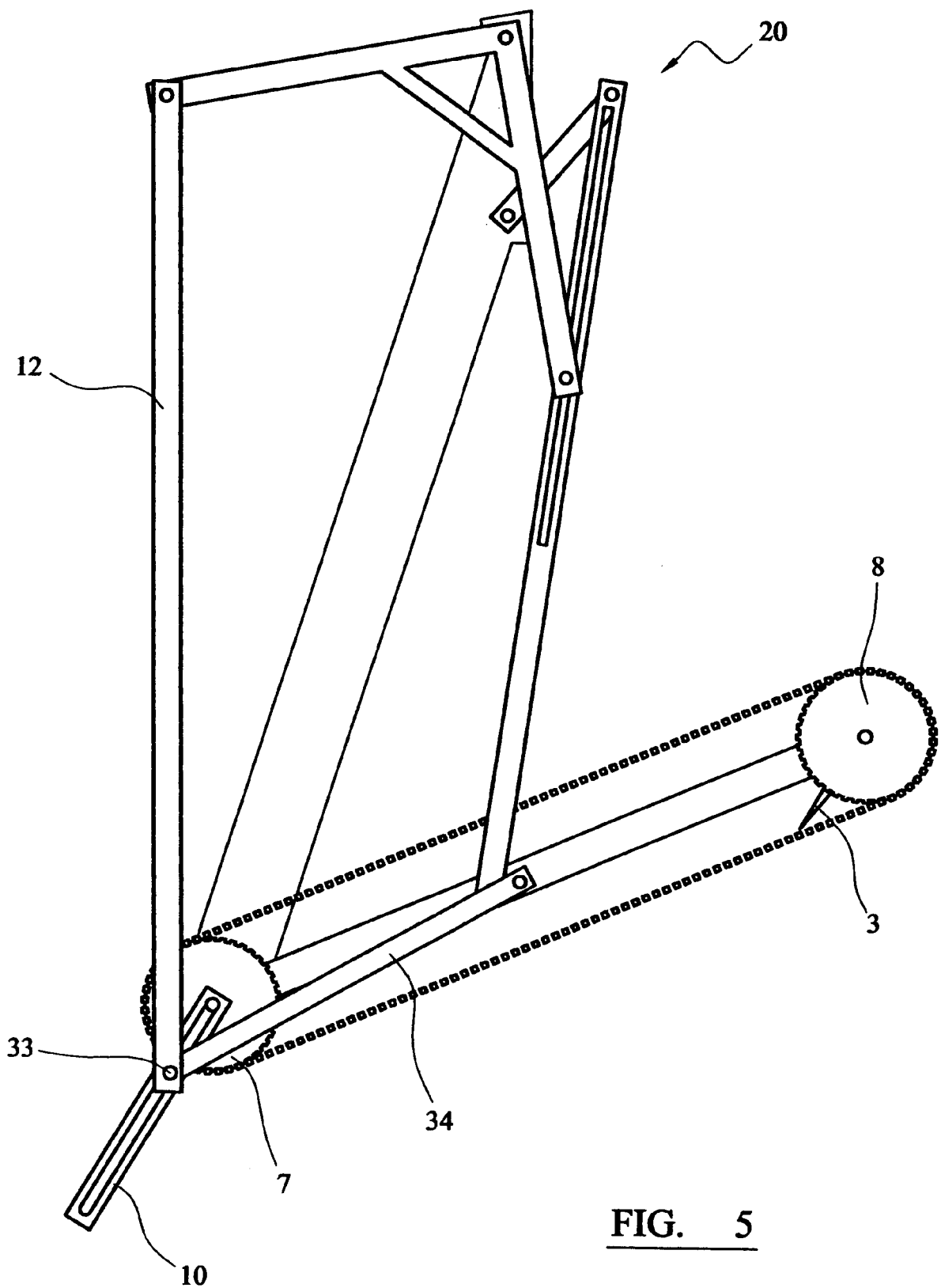

Shown in FIG. 5 is a further embodiment of an apparatus according to the invention. This differs from the previous embodiment in that the opposite end of the guide arm 34 is pivotally connected to the main lever 1 rather than the fixed external point 35. This introduces a component of motion in the pivot 35 between angle change arm 10 and angle drive arm 12 parallel to the direction of th flow of the stream. This improves fluid flow over the vane 3 further improving the efficiency of the apparatus.

Figure 6:
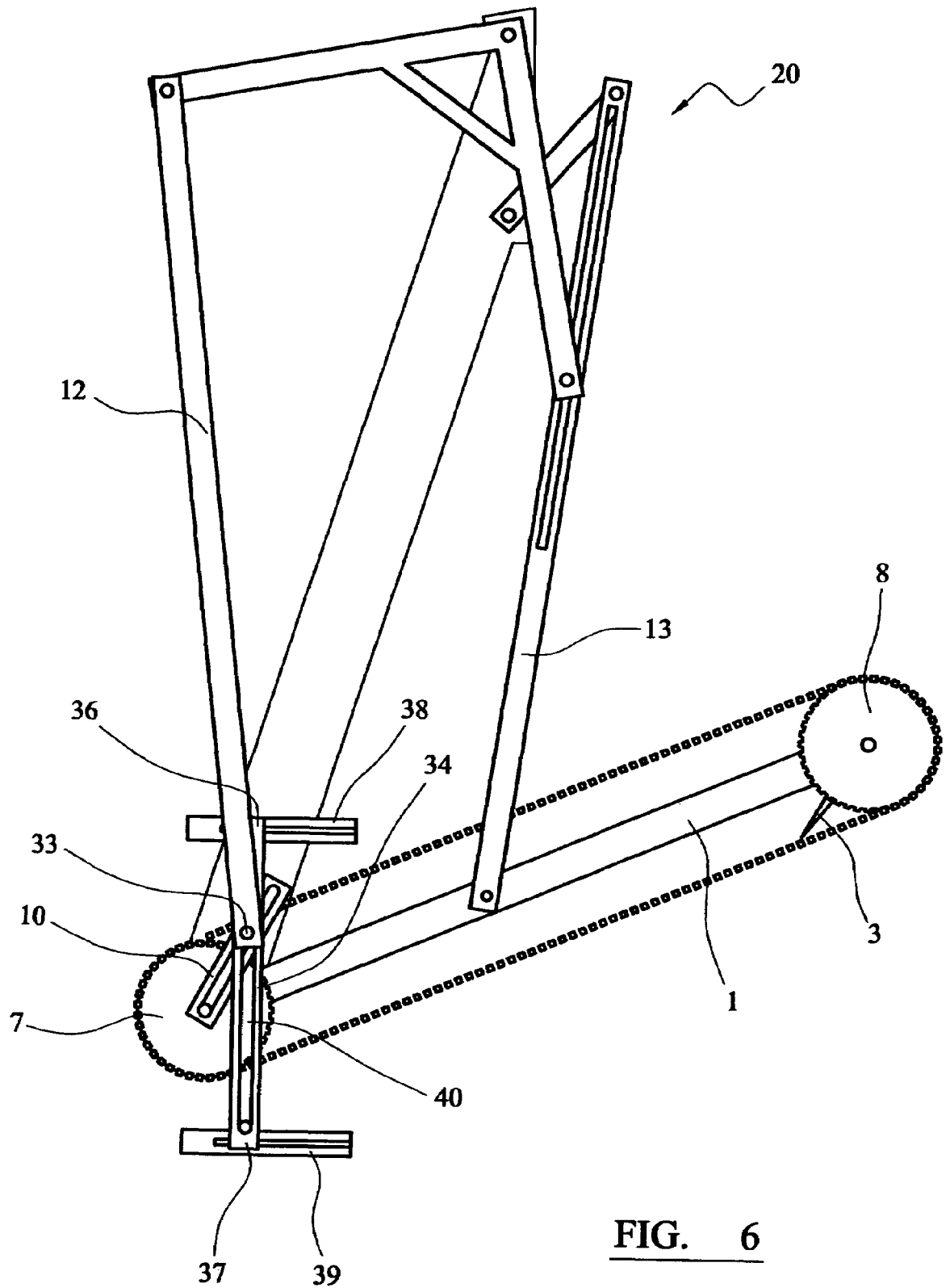

Shown in FIG. 6 is a further embodiment of an apparatus according to the invention. Again, only the angle change means 6 differs from the previous embodiments. In this embodiment the two ends 36,37 of the guide arm 34 are each free to slide along tracks 38,39 allowing lateral translation of the guide arm 34. The guide arm 34 comprises two rails which between them define a slot 40. The pivot 33 between angle drive arm 12 and angle change arm 13 is free to slide along the slot 40. In this embodiment the guide arm 34 is straight. In other embodiments the guide arm 34 can be curved. This form of guide arm 34 allows greater control over the vane angle as the vane 3 traverses the stream.

Figure 7:
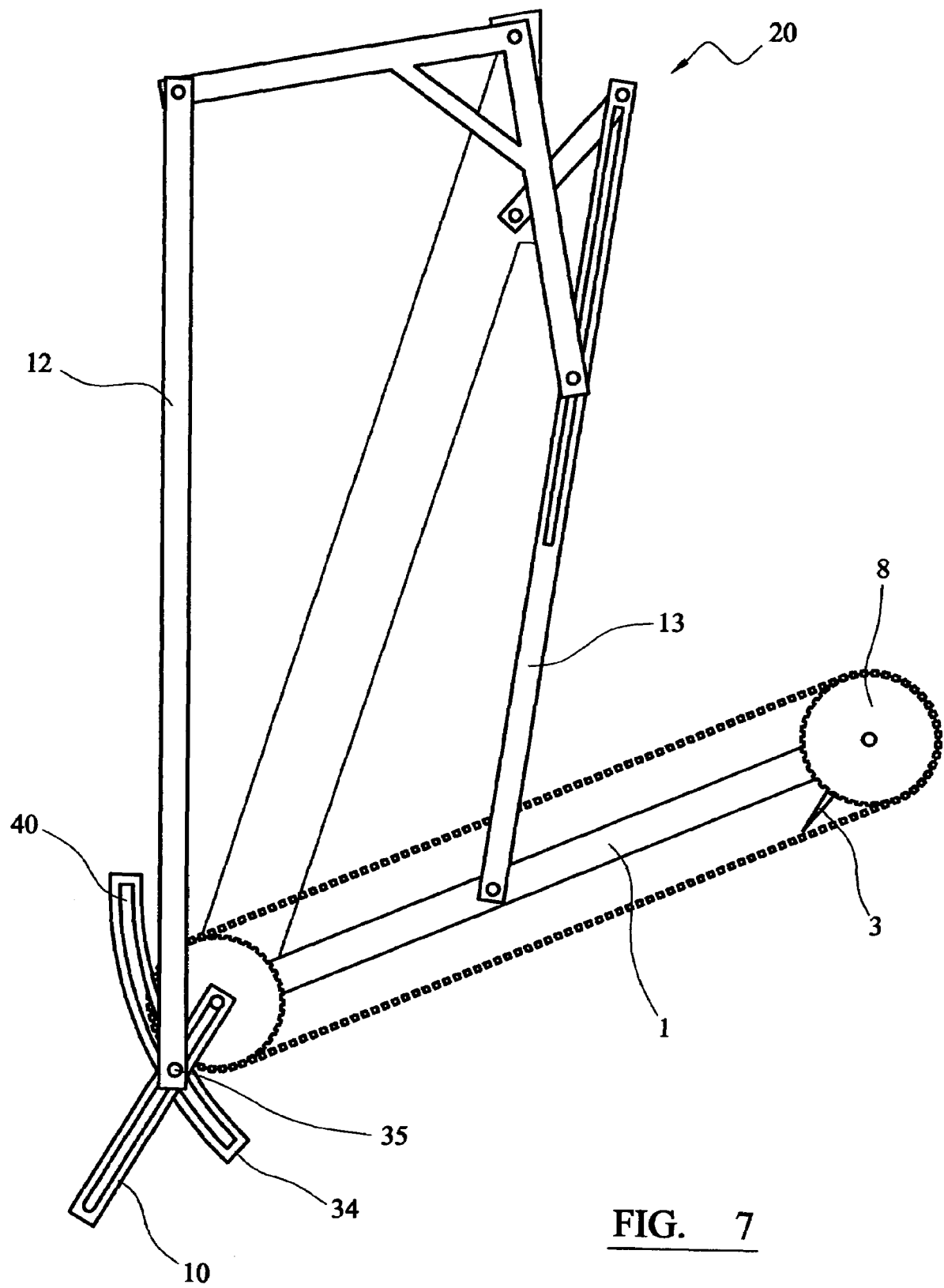

Shown in FIG. 7 is a further embodiment of an apparatus according to the invention. The guide arm 34 is connected in fixed relation to the main lever 1. The guide arm 34 comprises a pair of rails defining a slot 40 therebetween. The pivot 35 between angle change arm 10 and angle drive arm 12 is free to slide along the slot 40. Again, this allows greater control over the angle of the vane 3, increasing apparatus efficiency.

The apparatus has been described as a propulsion system whereby turning the main crank 21 drives the oscillation of the vane 3. The apparatus can also work in reverse whereby fluid flow oscillates the vane 3 which results in the turning of the main crank 21. The turning of the main crank 21 can then be converted into electricity by known means.

The invention claimed is:

1. An apparatus for oscillating a vane comprising:
a main lever pivoted at one end about a reference axis, and pivotally coupled at the other end to the vane about a vane axis remote from the reference axis;
an angle change assembly connected to the vane such that rotation of the angle change assembly rotates the vane; and,
a drive assembly, the drive assembly comprising
a crank arm adapted to be pivoted about a fixed crank axis;
a lever drive arm pivotally connected to the main lever at a point remote from the reference axis and pivotally connected to the main crank remote from the crank axis;
a coupling member having first and second coupling arms connected together at a base, the base being adapted to pivot about a coupling axis;
an angle drive arm connected at a first end to the angle change assembly for rotation thereof and pivotally connected to the first coupling arm remote from the coupling axis;

the second coupling arm being pivotally connected to the lever drive arm remote from the coupling axis, the pivot being free to slide along the lever drive arm.

2. An apparatus as claimed in claim 1, wherein the lever drive arm comprises a guide running at least partially along its length, the pivot between lever drive arm and second coupling arm being free to move along the guide.

3. An apparatus as claimed in claim 1, wherein the angle change assembly comprises angle change means free to pivot about the reference axis and a linkage connecting the vane to the angle change means such that rotation of the angle change means rotates the vane, the angle drive arm being connected to the angle change means.

4. An apparatus as claimed in claim 3, wherein the angle change means comprises a wheel free to rotate about the reference axis, the angle drive arm being connected to the wheel.

5. An apparatus as claimed in claim 3, wherein the angle change means comprises a first wheel free to rotate about the reference axis, a second wheel free to rotate about a second axis remote from the reference axis and a second linkage means extending between the two wheels, the angle drive arm being connected to the second linkage means.

6. An apparatus as claimed in claim 5, wherein the second linkage means comprises a chain which passes around the first and second wheels.

7. An apparatus as claimed in claim 3, wherein the angle change means comprises an angle change arm pivotally connected to the reference axis, the angle drive arm being pivotally connected to the angle change arm.

8. An apparatus as claimed in claim 7, wherein the pivot between angle change arm and angle drive arm is free to slide along the angle change arm.

9. An apparatus as claimed in claim 8, wherein the angle change assembly further comprises a guide arm having one end pivotally connected to the end of the angle drive arm to restrict the motion of the angle drive arm.

10. An apparatus as claimed in claim 9, wherein the pivot between angle drive arm and guide arm is free to slide along the guide arm.

11. An apparatus as claimed in claim 10, wherein both ends of the guide arm are free to slide on tracks laterally displacing the guide arm.

12. An apparatus as claimed in claim 10, wherein the guide arm is connected and fixed relation to the main lever.

13. An apparatus as claimed in claim 12, wherein the guide arm is curved.

14. An apparatus as claimed in claim 13, wherein the radius of curvature of the guide arm varies along its length.

15. An apparatus as claimed in claim 9, wherein the opposite end of the guide arm is pivotally connected to a fixed point.

16. An apparatus as claimed in claim 9, wherein the opposite end of the guide arm is pivotally connected to the main lever.

17. An apparatus as claimed in claim 1, wherein the first and second coupling arms are co-linear.

18. An apparatus as claimed in claim 1, wherein the first and second coupling arms are co-planar but not co-linear.

19. An apparatus as claimed in claim 18, wherein the coupling member is V shaped.

* * * * *